US008401912B2

(12) United States Patent
Ganz et al.

(10) Patent No.: US 8,401,912 B2
(45) Date of Patent: *Mar. 19, 2013

(54) METHOD FOR USING UNIQUE CODES TO TRADE VIRTUAL CHARACTERS

(75) Inventors: Howard Ganz, Ontario (CA); Karl Joseph Borst, Toronto (CA)

(73) Assignee: GANZ, Woodbridge, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 13/104,076

(22) Filed: May 10, 2011

(65) Prior Publication Data

US 2011/0213682 A1 Sep. 1, 2011

Related U.S. Application Data

(63) Continuation of application No. 11/838,641, filed on Aug. 14, 2007, now Pat. No. 7,970,663.

(60) Provisional application No. 60/915,499, filed on May 2, 2007.

(51) Int. Cl.
*G06Q 30/00* (2012.01)
(52) U.S. Cl. .......................... 705/26.1; 705/26.5; 705/56
(58) Field of Classification Search ................ 705/26.1, 705/26.5, 26.61, 27.1, 50, 58, 56
See application file for complete search history.

(56) References Cited

U.S. PATENT DOCUMENTS

| 5,375,240 A * | 12/1994 | Grundy ........................... 726/28 |
| 5,411,259 A | 5/1995 | Pearson |
| 5,802,296 A | 9/1998 | Morse et al. |
| 5,853,327 A | 12/1998 | Gilboa |
| 5,923,330 A | 7/1999 | Tarlton |
| 5,966,526 A | 10/1999 | Yokoi |
| 6,009,458 A | 12/1999 | Hawkins et al. |
| 6,031,549 A | 2/2000 | Hayes-Roth |
| 6,119,229 A * | 9/2000 | Martinez et al. ................ 726/28 |
| 6,159,101 A | 12/2000 | Simpson |
| 6,253,167 B1 | 6/2001 | Matsuda et al. |
| 6,267,672 B1 | 7/2001 | Vance |
| 6,290,566 B1 | 9/2001 | Gabai et al. |
| 6,404,438 B1 | 6/2002 | Hatlelid et al. |

(Continued)

FOREIGN PATENT DOCUMENTS

| EP | 1 382 372 A1 | 1/2004 |
| GB | 2365364 | 2/2002 |

(Continued)

OTHER PUBLICATIONS

Lehdonvirta, "Virtual Economics: Applying Economics to the Study of Game Worlds"; 2005.*

(Continued)

*Primary Examiner* — Matthew Zimmerman
(74) *Attorney, Agent, or Firm* — Pearne & Gordon LLP

(57) ABSTRACT

There is provided a character training and development system for a virtual environment and related method. A character can be purchased by a user and then registered on a communication network via a unique code. Once registered, a set of attributes can be assigned to the character based on the type and class of the character. Attribute values can be assigned to the attributes by default or by user preferences. The characters can be manipulated within the virtual environment. In particular, the characters can be trained in order to improve their skills, to add new skills, and to increase their overall value and worth in the virtual environment. In addition, the characters can be traded among users for a price based on their skills. Fees can be charged for each trade. Traded characters are given a new code to transfer all control of the character to the new owner.

14 Claims, 5 Drawing Sheets

U.S. PATENT DOCUMENTS

| | | | |
|---|---|---|---|
| 6,406,370 B1 | 6/2002 | Kumagai | |
| 6,468,155 B1 | 10/2002 | Zucker et al. | |
| 6,522,333 B1 | 2/2003 | Hatlelid et al. | |
| 6,539,400 B1 | 3/2003 | Bloomfield et al. | |
| 6,560,511 B1 | 5/2003 | Yokoo et al. | |
| 6,591,250 B1* | 7/2003 | Johnson et al. | 705/51 |
| 6,591,252 B1* | 7/2003 | Young | 705/67 |
| 6,595,858 B1 | 7/2003 | Tajiri | |
| 6,609,968 B1 | 8/2003 | Okada et al. | |
| 6,612,501 B1* | 9/2003 | Woll et al. | 235/494 |
| 6,685,565 B2 | 2/2004 | Tanibuchi et al. | |
| 6,692,360 B2 | 2/2004 | Kusuda et al. | |
| 6,722,973 B2 | 4/2004 | Akaishi | |
| 6,729,884 B1* | 5/2004 | Kelton et al. | 434/236 |
| 6,745,236 B1* | 6/2004 | Hawkins et al. | 709/218 |
| 6,758,746 B1* | 7/2004 | Hunter et al. | 463/9 |
| 6,773,325 B1 | 8/2004 | Mawle et al. | |
| 6,910,186 B2 | 6/2005 | Kim | |
| 6,918,833 B2 | 7/2005 | Emmerson | |
| 6,944,421 B2 | 9/2005 | Axelrod | |
| 7,037,166 B2 | 5/2006 | Shrock et al. | |
| 7,071,041 B2* | 7/2006 | Yamazaki et al. | 438/166 |
| 7,081,033 B1 | 7/2006 | Mawle et al. | |
| 7,089,083 B2 | 8/2006 | Yokoo et al. | |
| 7,171,154 B2 | 1/2007 | Fujisawa | |
| 7,179,171 B2 | 2/2007 | Forlines et al. | |
| 7,249,139 B2* | 7/2007 | Chuah et al. | 1/1 |
| 7,266,522 B2 | 9/2007 | Dutta et al. | |
| 7,297,063 B2 | 11/2007 | Fujisawa | |
| 7,300,344 B2 | 11/2007 | Fujioka et al. | |
| 7,314,407 B1 | 1/2008 | Pearson | |
| 7,478,047 B2 | 1/2009 | Loyall et al. | |
| 7,483,860 B2* | 1/2009 | Cronce et al. | 705/50 |
| 7,556,563 B2 | 7/2009 | Ellis et al. | |
| 7,593,864 B2* | 9/2009 | Shuster | 705/26.1 |
| 2001/0039206 A1* | 11/2001 | Peppel | 463/31 |
| 2001/0047340 A1 | 11/2001 | Snow et al. | |
| 2001/0049606 A1* | 12/2001 | Lucarelli | 705/1 |
| 2002/0082077 A1 | 6/2002 | Johnson et al. | |
| 2002/0094851 A1 | 7/2002 | Rheey | |
| 2002/0119810 A1 | 8/2002 | Takatsuka et al. | |
| 2002/0155893 A1* | 10/2002 | Swanberg et al. | 463/43 |
| 2002/0160835 A1 | 10/2002 | Fujioka et al. | |
| 2002/0161666 A1 | 10/2002 | Fraki et al. | |
| 2003/0023505 A1* | 1/2003 | Eglen et al. | 705/26 |
| 2003/0061147 A1* | 3/2003 | Fluhr et al. | 705/37 |
| 2003/0126031 A1 | 7/2003 | Asami | |
| 2003/0200156 A1* | 10/2003 | Roseman et al. | 705/27 |
| 2003/0220885 A1 | 11/2003 | Lucarelli | |
| 2004/0043806 A1 | 3/2004 | Kirby | |
| 2004/0053690 A1 | 3/2004 | Fogel et al. | |
| 2004/0093266 A1 | 5/2004 | Dohring | |
| 2004/0093302 A1* | 5/2004 | Baker et al. | 705/37 |
| 2004/0143746 A1* | 7/2004 | Ligeti et al. | 713/185 |
| 2004/0143852 A1* | 7/2004 | Meyers | 725/133 |
| 2004/0199471 A1* | 10/2004 | Hardjono | 705/50 |
| 2004/0242326 A1 | 12/2004 | Fujisawa | |
| 2005/0059483 A1 | 3/2005 | Borge | |
| 2005/0079912 A1* | 4/2005 | Hanafusa | 463/29 |
| 2005/0137015 A1 | 6/2005 | Rogers et al. | |
| 2005/0177428 A1 | 8/2005 | Ganz | |
| 2005/0182693 A1 | 8/2005 | Alivandi | |
| 2005/0192864 A1* | 9/2005 | Ganz | 705/14 |
| 2005/0250415 A1 | 11/2005 | Barthold | |
| 2005/0250416 A1 | 11/2005 | Barthold | |
| 2005/0272504 A1 | 12/2005 | Eguchi et al. | |
| 2006/0200409 A1* | 9/2006 | McMahon | 705/41 |
| 2006/0234795 A1* | 10/2006 | Dhunjishaw et al. | 463/42 |
| 2007/0082720 A1 | 4/2007 | Bradbury | |
| 2007/0087838 A1 | 4/2007 | Bradbury | |
| 2007/0087839 A1 | 4/2007 | Bradbury et al. | |
| 2007/0088656 A1 | 4/2007 | Jung et al. | |
| 2007/0099685 A1 | 5/2007 | Van Luchene | |
| 2007/0179978 A1* | 8/2007 | Lee et al. | 707/104.1 |
| 2008/0039166 A1* | 2/2008 | Harris et al. | 463/8 |
| 2008/0039167 A1* | 2/2008 | Harris et al. | 463/8 |
| 2008/0176658 A1 | 7/2008 | Wright | |
| 2009/0203446 A1 | 8/2009 | Bradbury et al. | |

FOREIGN PATENT DOCUMENTS

| | | |
|---|---|---|
| JP | 2002063092 | 2/2002 |
| WO | 01/69829 A2 | 9/2001 |
| WO | 01/77982 A1 | 10/2001 |
| WO | 01/90841 A2 | 11/2001 |
| WO | 02/27591 A1 | 4/2002 |
| WO | 02/054327 A1 | 7/2002 |
| WO | 2008/019242 A2 | 2/2008 |

OTHER PUBLICATIONS

World of Warcraft Manual, 2004.
World of Warcraft Daily Quests (May 25, 2007 (Wayback Machine), www.wowwiki.com/dailLquest).
The Helpful Neopian, retrieved Mar. 25, 2010.
The Elder Scrolls III: Morrowind, May 2002 (game release), Wikipedia, <http://en.wikipedia.org/wiki/The_Elder_Scrolls_III:_Morrowind>.
Neopian Hospital, retrieved Mar. 24, 2010.
Neopets—Archeology, retrieved Mar. 25, 2010.
Mark Ward, "Virtual cash exchange goes live" BBC News Online (Jan. 7, 2004).
Lehdonvirta, "Real-Money Trade of Virtual Assets: Ten Different User Perceptions"; 2005.
IGN's Complete Guide to Pokemon: Blue and Red, IGN, archive Apr. 27, 2006), last accessed Sep. 4, 2010, <http://web.archive.org/web/20060427131258/http://guides.ign.com/guides/16708/>.
http://web.archive.org.web.20031202190119/www.monopets.com/, Dec. 2, 2003.
Grace, "Web Site Tycoon's Next Goal: Sixth Grade"; Woonsocket Call, Jun. 19, 2002.
First Exam Report—AU2008201957—Nov. 20, 2009.
First Exam Report—AU2008201956—Nov. 19, 2009.
First Exam Report—AU2008201954—Nov. 20, 2009.
Blizzard Enterainment, Diablo II Game Manual, Jun. 2000.
Blizzard Enterainment, Diablo Game Manual, Dec. 1996.
"The Sims Booklet," dated 2000.
""Pokemon game mechanics"", Oct. 7, 2006, Wikipedia,<http://web.archive.org/web/20061 011 003155/en.wi kiped ia. org/wiki/Pok%C3%A9mon_game_mechanics>.
Mannien et al., "The Value of Virtual Assets—The Role of Game Characters in MMOGs", Int. Journal of Business Science and Applied Management, 2/1, pp. 21-33, 2007.
Grimes, "Online multiplayer games: a virtual space for intellectual property debates?", New Media & Society, 8, pp. 960-990, 2006.
Tyson McCann, "Star Wars: Knights of the Old Republic PC Review", GameBanshee, <http://www.gamebanshee.com/reviews/software/kotorpc1.php>, Dec. 1, 2003.
IGN, "Creator Creation-Icewind Dale II wiki guide", <www.ign.com/wikis/icewind-dale-ii/Character_Creation>,<http://www.ign.com/games/icewind-dale-ii/pc-17521>, Aug. 27, 2002.

* cited by examiner

METHOD FOR USING UNIQUE CODES TO TRADE VIRTUAL CHARACTERS

CROSS-REFERENCE TO RELATED APPLICATION

This application is a continuation of U.S. patent application Ser. No. 11/838,641 filed on Aug. 14, 2007, which claims the benefit of U.S. Provisional Application Ser. No. 60/915,499, entitled CHARACTER DEVELOPMENT AND EXCHANGE and filed on May 2, 2007, the entirety of both of which is incorporated herein by reference.

FIELD OF THE INVENTION

This application relates generally to computer-based character development. More specifically, this application relates to a character development and exchange system that facilitates the improvement of character traits and skills and increasing their value as a result of such improvements within a virtual environment.

BACKGROUND OF THE INVENTION

The Internet has become a common resource for entertainment seekers. Through various entertainment websites, virtual communities have been established that allow users to create a virtual or online reality for themselves. Computer games have also crossed over into the online world, allowing users to play against or along with each other from the comfort of their own personal Internet connections located across town or across the country. When it comes to most online entertainment activities including gaming and virtual communities, a disconnection unfortunately exists between objects in the real world and objects in the online world.

More recently, however, entertainment websites have been developed in which the website content is directly tied to a product that is purchased by a user. For example, as disclosed in United States Patent Application Publication No. 2005/0192864 to Ganz, incorporated herein by reference, a user purchases a toy that includes a secret code provided in the toy packaging. Access to a certain interactive content on the website provided by the manufacturer of the toy is restricted to users who purchase a toy. When the user carries out a registration process on the manufacturer's website, which involves entering the secret code, a virtual world is presented to the user. The virtual world includes a virtual toy corresponding to the toy purchased by the user. The user can participate in various interactive activities involving the virtual toy. The user may then purchase additional toys and enter the secret codes provided with those toys to add additional virtual toys to the virtual world. These virtual toys can interact with each other, thereby enhancing the user's entertainment experiences. Despite the popularity of such websites, consumers continue to demand more interactive capabilities and more flexibility with respect to their online or virtual reality products.

SUMMARY OF THE INVENTION

The subject application relates to a system(s) and/or methodology that facilitate character development and exchange. In particular, there is provided a method comprising allowing a first user to register a character using registration information; based on said registration information, allowing access to information indicative of the character on a website, which information represents said character, said character having plural initial attributes based on said allowing, each of said initial attributes can be changed by the first user through interaction with the character on the website to form a personalized version of the character that has different attributes than said initial attributes; and using said website, allowing the first user to transfer the character including all of its changed characteristics, from the first user to a second user, while allowing the first user to continue to access said website but preventing said first user from interacting with said character after said transfer.

According to another aspect, there is provided a method comprising first allowing a first user to access a website and to interact with at least one character on said website; second allowing the first user to register a second character using a unique code that is associated with the second character, where the unique code is uniquely identified with a specific character, and where use of the unique code causes information indicative of the second character to be obtained from a database, and associated with a registration, and allows the first user to interact with said second character on the website, and to customize said second character by interacting with the second character; and third allowing the first user to transfer the second character to a second user, where said transfer comprises deactivating the unique code to prevent the first user from accessing the second character, providing a new unique code to the second user which allows the second user to access the second character as customized by the first user on the website, and allowing the first user to continue to access said at least one character on said website.

According to yet another aspect of the invention, there is provided a method comprising on a website, allowing a user access to features of the website, and allowing the user to access specified characters on the website; accepting registration information for an additional specified character on the website, and responsive to said additional registration information, allowing the user to access said additional specified character on said website, said additional registration information causing the website to access personalization information about the additional specified character, including initial attributes possessed by the additional specified character; allowing the user to personalize the additional specified character, by changing plural of said attributes through interaction with the additional specified character on the website; and using a function on the website, allowing the user to sell a personalized version of the additional specified character as personalized via said changing of said plural attributes, to another user.

According to still another aspect of the invention, a method comprises accepting registration information for a character to be accessed on a website, said registration information identifying the character to be accessed; reading from a database, information about each of a plurality of different attributes that are associated with the character to be accessed and a total number of points to be used in associating with said attributes; allowing a user to allocate said plurality of total points between the different attributes, so that a total of the number of different attributes does not exceed said total points, wherein each of the different attributes are allocated a same or different amount of points; and allowing the user to interact with the character on the website, based on said attributes.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
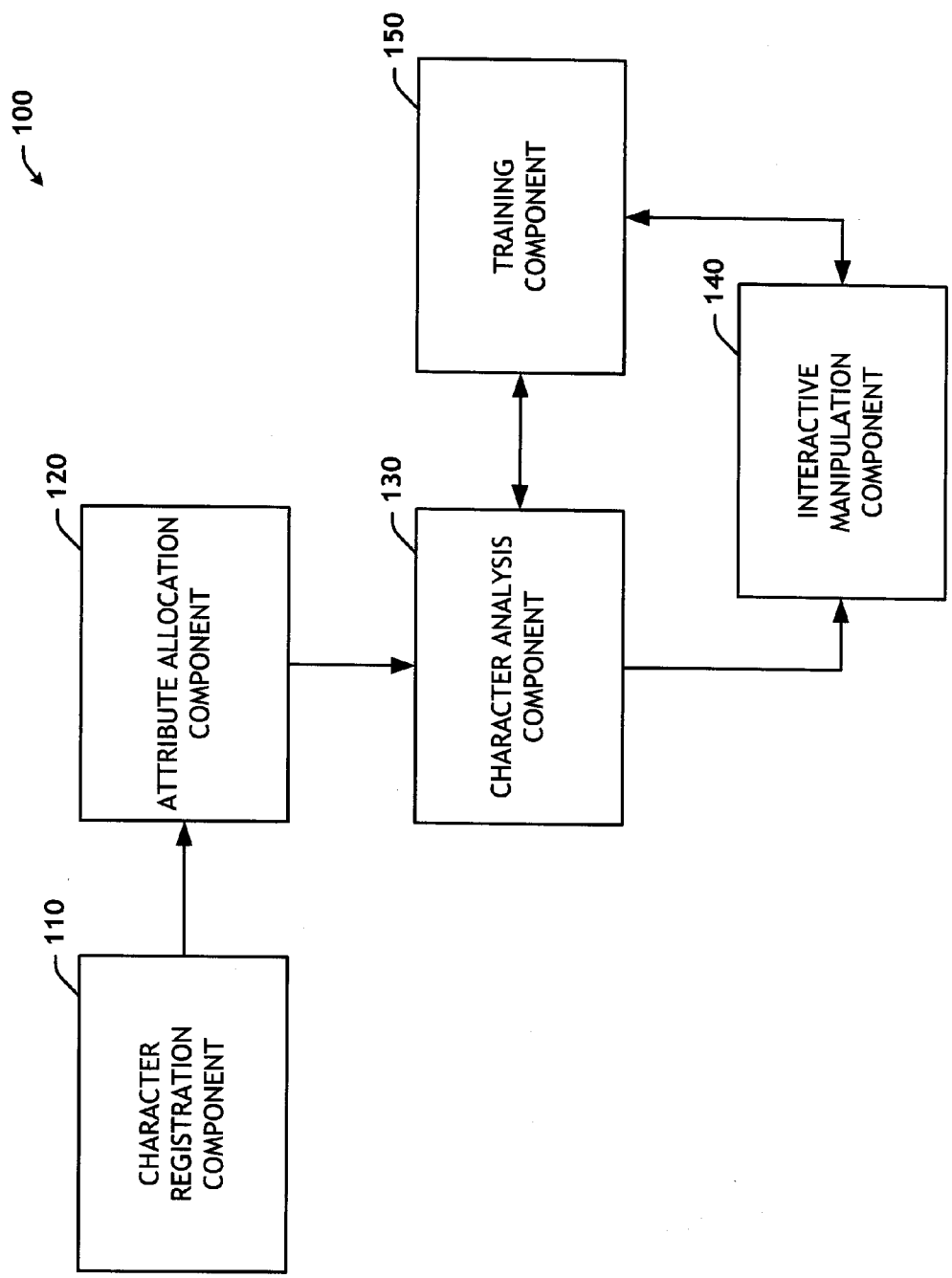
FIG. 1 is a block diagram of a character development system that facilitates allocating attributes to a character and developing those attributes and/or new attributes to enhance interactive play of the character in a game environment.

The subject application as described in further detail below relates to a character development and/or exchange system in which a user can, through codes attached to or otherwise associated with a physical product and/or computer-based image of the product (as represented on a computer display), obtain virtual characters or images of characters within a virtual world. The characters can be comprised of various features such as core attributes, potential skills, optional and/or inherent powers, and specific classifications. It is intended herein that the term 'attributes' includes skills, traits, and characteristics of the character. In an embodiment, characters are initially purchased (from a vendor or retailer) in a similar initial state having a core set of characteristics or attributes for all users. Each character has the potential to improve and/or mature beyond their initial state. This can be accomplished in part by playing with the character within the virtual world (e.g., games, adventures, and/or challenges), winning events, dedicated training of the character, and obtaining additional feature codes attached to auxiliary products for the character, all of which can earn points for the character. The accumulated points can then be used to train and/or develop the character with additional attributes.

Characters are available in different types and classes. Examples of different types of characters include but are not limited to sports players, soldiers/fighters, firemen, students, animals, etc. Sports players and animals can be further divided into different types of animals and different types of sports players. Characters of a similar type can be divided into different classes. Examples of different classes of animals include but are not limited to mutts (or mixed-breed), purebred, award-winner, and the like. Ownership of a character in any one class unlocks content that is available only to that class. As additional characters are obtained from different types and classes, additional content is opened up and made available and viewable to the user. Thus, additional areas of the virtual environment become accessible by the user as the user collects more characters of different types and in different classes.

In a similar manner, character training can also be limited by or based upon the type or class of the character. For example, a baseball playing character cannot be trained with a football playing skill or a fighting skill. Similarly, a ninja-assassin class of character cannot be trained with a skill from a different ninja class, such as a ninja-jumper class. However, some classes of characters can be promoted to an upper subclass based on the accumulated attributes. For example, a rookie (sub-class) sports player character can be promoted to a professional (sub-class) sports player once a particular attribute or skills level is reached. By training and developing the character to have more or better skills, talents, and/or powers, the overall value of the character increases. The trained character may be traded to other users. Hence, this training imparts a value to the character that can be monetized by a user through the training process.

The combination of the character's total calculated value and its perceived value (including the value of the auxiliary items) assigned or associated with the character creates this real-world monetary value of the character. As an example, a first user develops a highly skilled pitcher. The first user can make the pitcher available for exchange to someone else. A second user who is building up a baseball team of characters may want to acquire a trained pitcher. Through the direct mechanism for buying, selling, trading, auctioning, or otherwise exchanging characters and their associated items between users as provided herein, the second user can buy the pitcher from the first user.

An embodiment performs the transaction in a secure manner using the character's code. The embodiment uses characters as well as their items which are linked to unique codes. When a character, for example, is made available for sale, auction, or trade, the item is in effect "escrowed," tolling the ability to interact with and manipulate the character. This is done to prevent further development or changes to the character during the "on-sale" period. Therefore, the owner of the character is restricted from modifying the character. The owner may still withdraw the character from sale, auction, or trade. When the transfer is confirmed, the current code is disabled or deleted. A new code is generated and/or assigned to the character and given to the new owner/user of such character. The new owner can then add the character to his/her account and interact with it as desired. Thus, the previous owner/user transfers ownership and control of the character to the new owner, and the new owner assumes exclusive control of the character and its items. Since the new code is not given to the previous owner/user, the previous owner has no way of retaining or regaining control over the character.

The subject application will now be described in further detail with reference to FIGS. 1-5.

FIG. 1 shows a general block diagram of a character development system 100. The system 100 includes a character registration component 110 that registers the character with a communication network via a code. The code can be unique to the particular character and can provide various features associated with the character to the user. For example, the user may purchase the character and/or another product that includes the character (e.g., game). Upon such purchase, the code is provided to the user (e.g., associated with product packaging). The character registration component 110 receives and processes the code in order to give the user control of the character within the virtual environment (e.g., game or virtual reality environment).

Following registration, an attribute allocation component 120 can allocate a set of attributes to the character. This set of attributes is based on the type and/or class of the character. For example, if the character is a baseball player, then the attributes may include pitching, running, hitting, catching, and fielding skills. Initially, the character may be granted a basic or core set of attributes and attribute values (e.g., pitching=2, running=2, hitting=2, catching=2, and fielding=2). In many cases, the value of each attribute may be relatively low, leaving potential for the character to improve through training. For instance, the attribute value can be based on a 10-point scale, where 0 indicates no skill and 10 indicates the highest attainable skill. Initially, for example, the attributes can be allocated in a preset or standard manner so that each attribute is given a value of 2 as shown above. This standard value can differ according to the type of character as well as its class. That is, the attribute values may be based on a different value scale depending on the type of character and class of character.

Alternatively, the character acquired can be more specialized, such as a pitcher baseball player character. In this case, the initial set of attribute values may be initially distributed across the basic set of attributes as follows: pitching=4, running=2, hitting=2, catching=2, and fielding=2. Higher attribute value may represent an untrained skill level for certain characters. Again, it should be appreciated that this allocation of attribute values is merely exemplary and many other allocations are possible.

The system 100 also includes a character analysis component 130 that analyzes the character's attributes to determine which level of play it can participate in and to determine what kind of training is available to it. Thereafter, the character can be manipulated by an interactive manipulation component 140, which earns points for the character, or can be trained by a training component 150. It should be appreciated that when the character is undergoing training, it is not subjected to the interactive manipulation component 140.

Training a character involves using or trading in points for specific improvements to the character. Points can be earned or purchased using real or virtual currency. Improvements can vary in cost depending on the importance to the character, to the game or environment associated with the character, and the level of improvement achieved.

An alternative training procedure can involve performing certain exercises or tasks with the character in order to add the particular skill or attribute to the character's list of attributes. For example, practicing pitching may increase the pitching attribute. Alternatively, specific powers can be immediately applied to the character upon redemption of a required amount of points or when a certain overall attribute level is reached. For example, when the character has reached the highest attainable skill level for its type and class of character, a specific power can be assigned to it (e.g., baseball playing character: a power to always hit a home run when at bat; or fairy character: a magical power to turn spiders into flowers).

Figure 2:
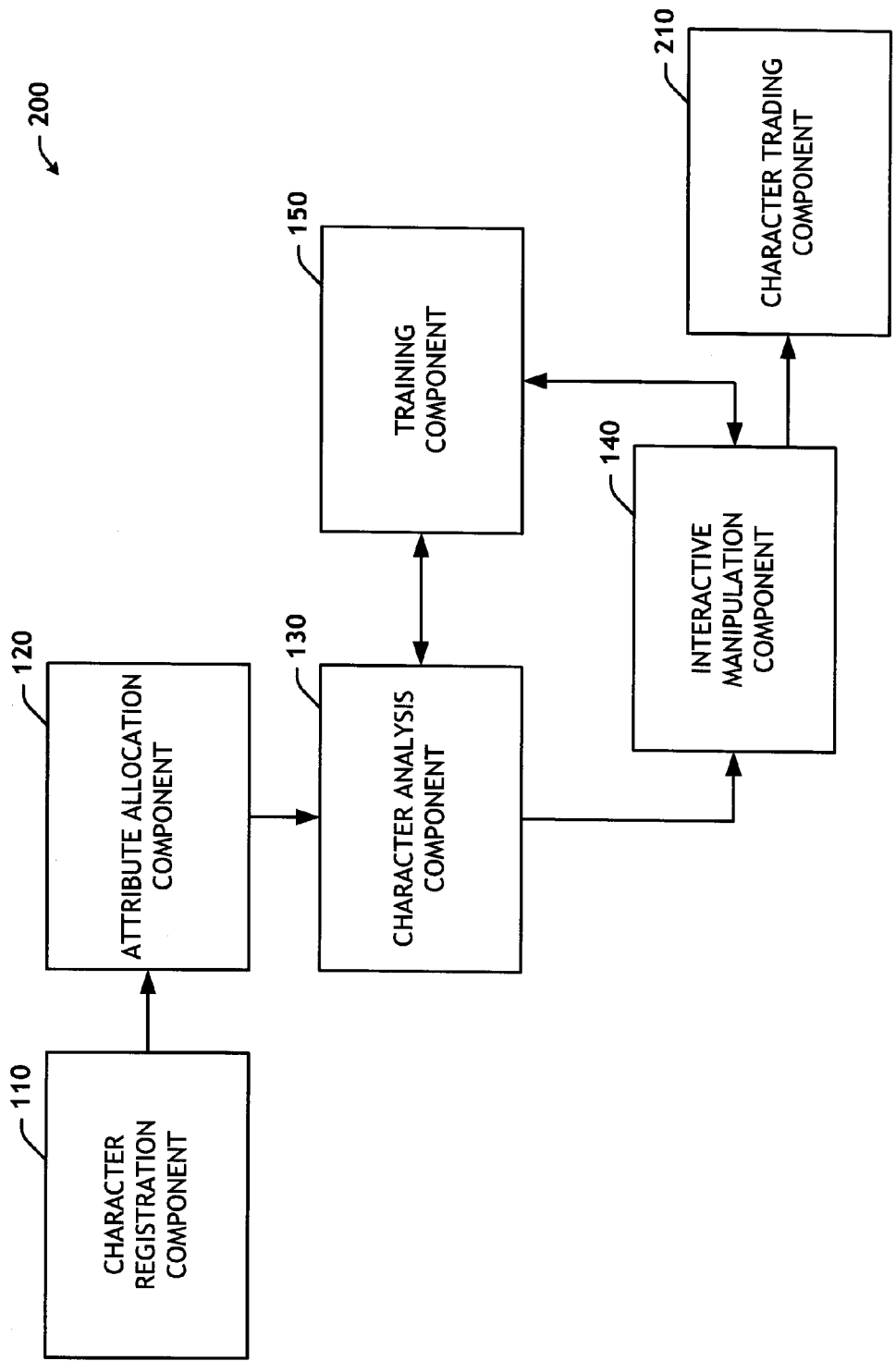
FIG. 2 is a block diagram of a character development and exchange system that facilitates allocating attributes to a character as well as training the character with new attributes in order to increase the value of the character for selling and/or trading purposes.

In FIG. 2, there is a block diagram of a character development and exchange system 200 that facilitates allocating attributes to a character as well as training the character with additional attributes in order to increase the value of the character for selling and/or trading purposes. The system 200 is similar to the character development system 100 discussed in FIG. 1 but includes a character trading component 210. The character trading component 210 locks the unique code associated with the character and its auxiliary items (e.g., equipment, clothing, furnishings, land, territory, property, weapons, etc.) so that the current owner of the character can no longer change or otherwise alter the status of the character and its items during the "offer" time period. To complete a transfer transaction and to transfer the character to a new owner, the character trading component 210 also generates and/or assigns new unique codes for the character and its items. As a result, the previous owner no longer has control of the character and is prevented from hijacking and re-claiming control of the character after it has been purchased by another user.

Figure 3:
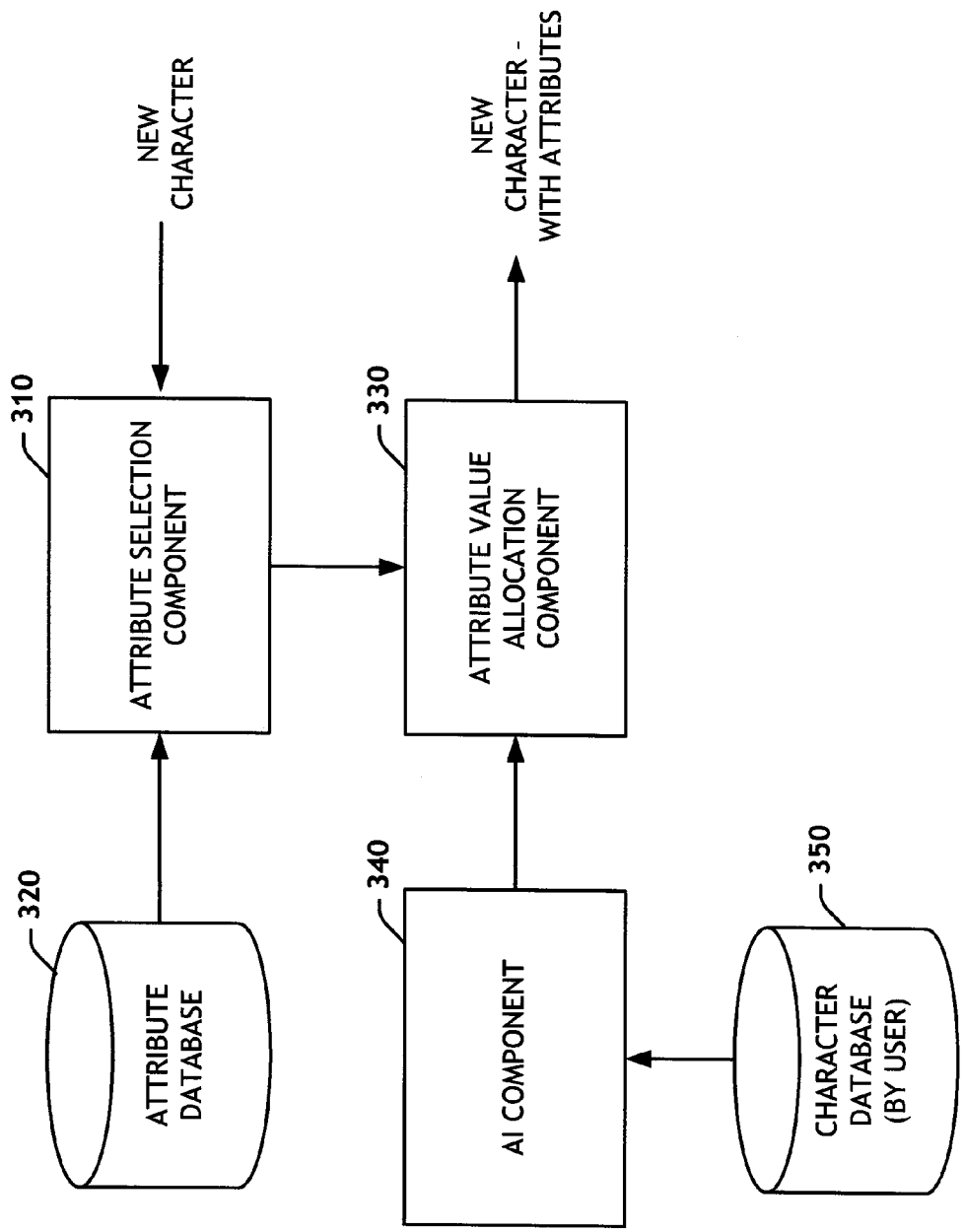
FIG. 3 is a block diagram of an attribute allocation aspect of the character development system of FIG. 1 that allows for automatic or user-designated allocation based on a type or class of character.

FIG. 3 shows a block diagram of an attribute allocation aspect of the character development system 100 of FIG. 1 that allows for automatic or user-designated allocation based on a type or class of character. When a new character is acquired by a user, an attribute selection component 310 can select one or more attributes from an attribute database 320. The particular attribute database and/or selection therefrom can be based on the type or class of character acquired. For instance, a football player character has a set of available attributes that are substantially different from a warrior-fighter character's set of available attributes. Attributes can also have sub-attributes. Take for example a baseball player's running attribute. There can also be a running-slide sub-attribute as well as a running-stealing sub-attribute.

As previously mentioned, the attributes selected can differ based on the type or class of character. For example, a ninja-assassin character can have attributes which are different from those available to a ninja-warrior character—in order to maintain some distinction between different classes of ninjas. For example, a ninja assassin character may have the following core attributes: skill=3; speed=1; hide in shadow; and back stab. The ninja-warrior character may have core attributes such as one-on-one combat=3; camouflage=2; acrobatic combat=3. The ninja assassin can also be limited to the following maximum attribute values for strength (8) and energy (8); whereas a ninja-warrior can have a strength limit and an energy limit set at 10 along with different skill and speed attribute values. As an alternative to hard limits on attribute values, it may become more difficult to train above those attribute values. For example, it may become 100× more difficult to train the ninja assassin to strength values above 8.

The allocation of attribute values can be performed in a standard manner by an attribute value allocation component 330 and be based in part upon user input and/or in part according to the user's other characters. When allocated in a standard manner, the attribute values are assigned in the same distribution for each user for that particular character. That is, all baseball player characters, for example, are automatically assigned pitching=3, catching=3, running=4, hitting=5, and fielding=3.

Alternatively, the user can be given a set number (e.g., 20) of attribute value points to distribute across the initial set of attributes for the character based on user preferences. Additionally, one or more particular attributes can be set by the attribute value allocation component 330 and the user can assign the remaining value points to the other attributes. For instance, the hitting attribute can be set to 5, leaving 15 value points to be distributed by the user among the remaining four attributes.

The attribute value allocation component 330 can also allocate the attribute values based on an analysis by an AI (artificial intelligence) component 340. The AI component 340 can learn from the characters currently and/or previously owned by the user (via a character database 350) and determine an optimum distribution of the available attribute value points. In particular, the AI component 340 can learn from the user's character history and previous attribute value distributions made by the user. By doing so, the allocation of value points is automatic yet based on the user's current characters and preferences as indicated by previous attribute value distributions and/or other relevant historical data.

Figure 4:
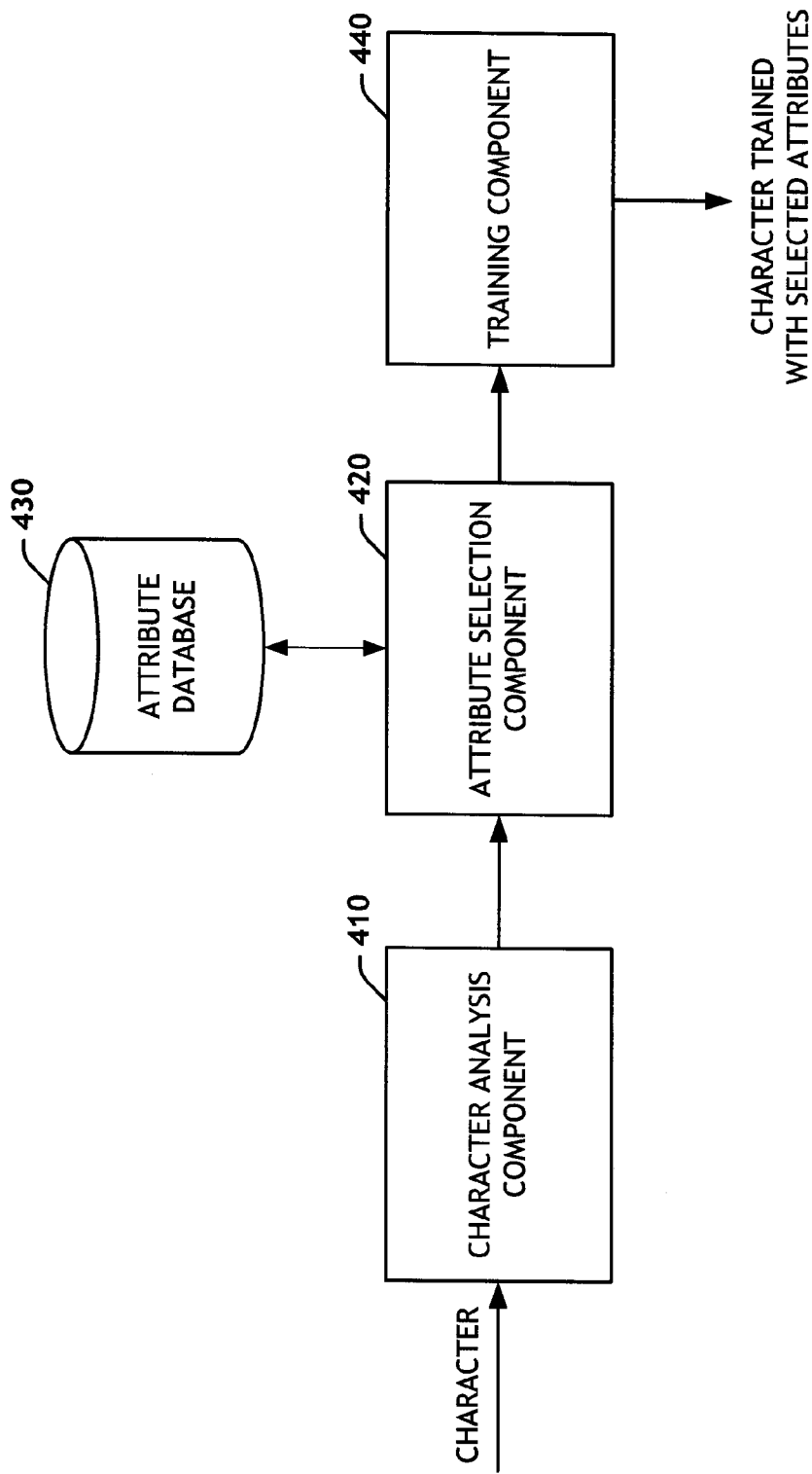
FIG. 4 is a block diagram of an attribute training aspect of the character development system of FIG. 1 that allows for training the character with additional attributes based on existing attributes of the character.

FIG. 4 illustrates a block diagram of an attribute training aspect of the character development system 100 of FIG. 1 that allows for training the character with additional attributes based on existing attributes of the character. Before actual training is performed, a character analysis component 410 can evaluate the current status of the character to determine a current list of its attributes, which may include any or all of skills, talents, powers, and characteristics, as well as the character's class and/or type. Based on the foregoing, an attribute selection component 420 can select one or more attributes from an attribute database 430, and can also total a cost, if any, for those skills. However, the attribute selection component 420 can be programmed so that it is not permitted to select attributes that exceed the currency or point balance of the user.

Points can be earned by involving the character in games, adventures, challenges and the like in the virtual environment associated with the character. Points can also be earned by winning or performing certain tasks or can be purchased using virtual or real currency. Training of character-specific attributes can also be earned as a reward for winning designated challenges or competitions or by completing certain adventures.

The training of characters is performed by a training component 440 according to a fluctuating or graduated basis. In particular, higher level or more advanced characters are easier to train than lower level or less advanced characters. Training a character can be time-consuming and difficult and may not always end in success for the character. However, training is not completely user-dependent but rather is at least partially character-dependent. That is, the actual character contributes to or plays a part in the training so that the overall skill level achieved by a character is not solely dependent on the personal skills of the respective user who controls the character. Users are not required to possess exceptional skills in order to excel in creating a valuable or well-trained character. For example, for characters initially having higher core attribute values, the training exercises or tasks that must be performed by the user may be made easier so that less manual dexterity and timing is required to successfully complete the exercise or task or so that each training item product effect on the attribute value. By contrast, for characters initially having lower core attribute values, the exercises or tasks can be made more difficult, meaning that more time is needed for each training exercise or that each exercise has less increase on the numerical score or value. Furthermore, limits can be placed on specific attribute values of certain characters, so that these characters will never be able to reach attribute values as high as other characters. This arrangement provides the appearance that particular characters have more natural or inherent talent than others.

Training of a character is also restricted to the type or profession related to the character. For example, a horse character cannot be trained with baseball playing attributes. Rather, the horse character can only be trained with horse-related attributes to improve its involvement in horse games, adventures, and competitions. Similarly, a baseball playing character can only be trained with baseball related attributes. If the class of baseball player is indicated such as a pitcher, its pitching-related attributes can have a higher maximum value than the other baseball playing attributes (e.g., running, hitting, fielding, etc.).

Characters can also be injured or can become ill as a result of their participation in a game or adventure. When either occurs, training may not be allowed until the character heals or becomes well as indicated by a health indicator. Characters can heal or recover by waiting a pre-determined time period or by visiting a virtual health clinic. Healing or recovery can also be paid for by using points or currency (e.g., real or virtual money). In some cases, forcing the character to train when either injured or ill can reduce one or more attribute values as well as the overall value of the character. In addition or in the alternative, the character's injury or illness can worsen as a result of the forced training.

Through a feedback component (not shown), the characters can provide solicited or unsolicited feedback to their respective users with respect to their training or status. More specifically, each character can communicate using audible speech, text, facial expression or some other type of image-based expression. The feedback can inform the user about how the character is feeling at any given time and the character's opinion on the training that has occurred or that is scheduled to occur. In the latter case, imagine that the user has just completed a process of selecting one or more attributes on which the character is to be trained. Before the user redeems points or currency for such attributes, the character can give their opinion of the selections to mitigate wasting points or wasting training opportunities. In addition, the character can provide feedback during as well as after the training. The feedback can include emotional thoughts or responses to the recent training. For example, the character can inform the user that the training is going well or is too difficult or that it needs training in another skill before it can complete the current training Feedback received from the character can be stored and used later when determining which attributes to select for the same character or for other characters owned by the same user. Therefore, subsequent attributes can be selected either independently of or dependent upon previously selected attributes.

The characters also maintain a history or background and as a result of training and participating in their individual games, adventures, competitions, or challenges in the virtual environment, the characters individually develop and mature based on such experiences. The maturity of a character can be visualized through physical changes in their appearance. For example, a young horse, as evidenced by size, age, and attributes when initially acquired by a user, can gradually grow to physically appear bigger and even stronger based on its experiences in the virtual environment and based on its training thus far. Its coat may look shinier and its mane longer and sleek compared to when it was initially acquired by the user. It should be appreciated that each character can undergo physical maturation that is appropriate for the type of character. The maturation process can include a maximum growth limit and can depend on at least one of experiences, training, or a combination of both. The outward appearance of a character can readily indicate skill level of the character, which may make assessing the value of the character more efficient.

Figure 5:
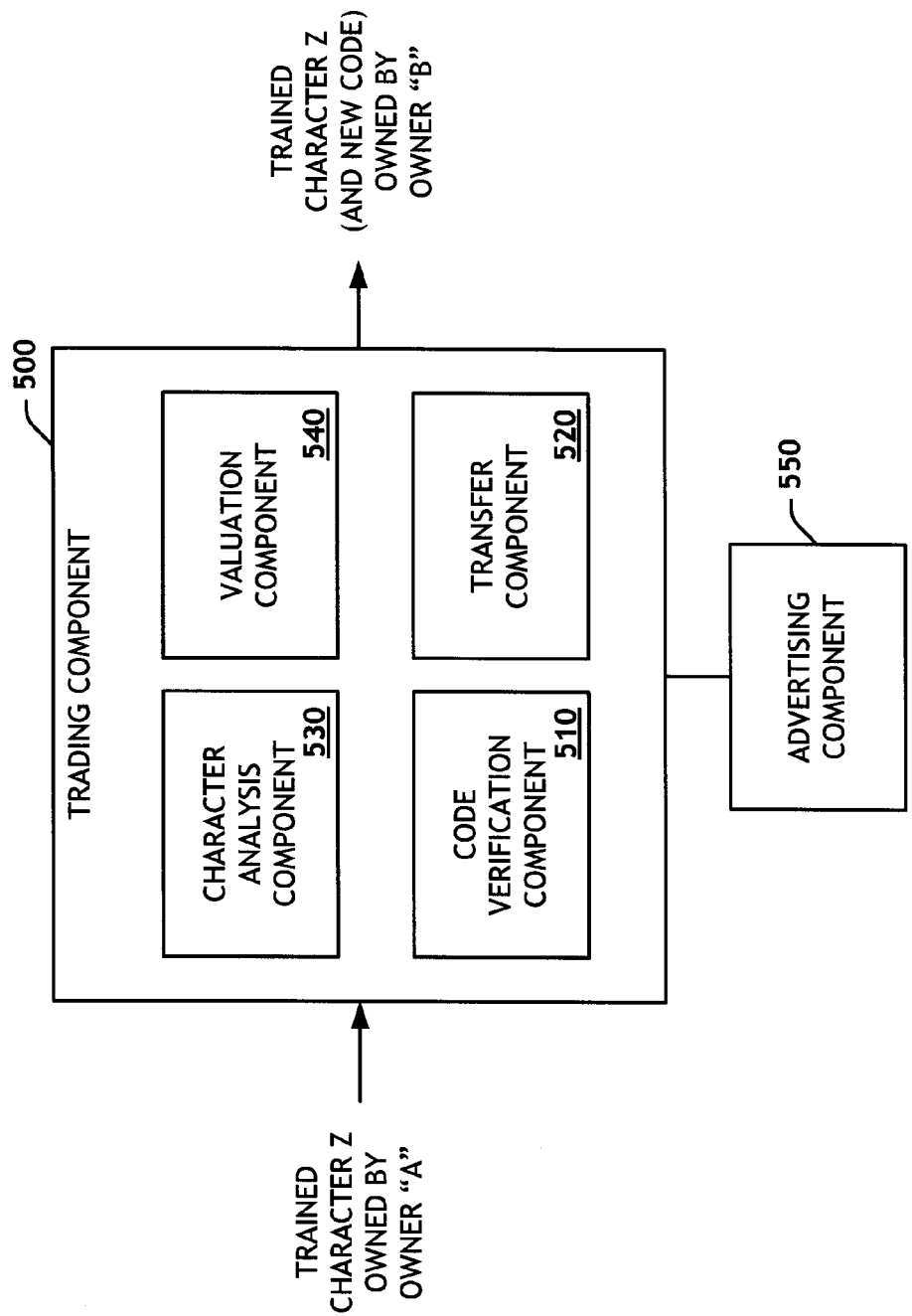
FIG. 5 is a block diagram of a trading aspect of the character development and exchange system of FIG. 2 that facilitates selling and/or trading the character to another user.

FIG. 5 shows a block diagram of a trading aspect of the character development and exchange system of FIG. 2 that facilitates selling and/or trading the character as well as control of the character to another user. As shown in the figure, a character can be made available for sale, auction, trade, or exchange. The value of the character can depend on its list of attributes, its type and/or class, as well as its experiences. For instance, a certain class of character can be rated at a higher value based on current demand for the character or based on popularity of the character or of the virtual environment that is associated with the character. If the class is retired or in limited edition where only a fixed number of characters are made available in the class, each character in that class may have an increased value aside from their specific attributes and experiences.

A trading component 500 effectively blocks access to the character by the user (or locks the character) to prevent the current owner-user from modifying the character while it is available for sale or exchange. If the exchange is made, for example, the trading component can disable or delete the code and generate and/or assign a new code to the character. The new owner receives the new code and registers the character via the new code in order to access and exclusively control it in the virtual environment. If the exchange is not made and the user decides to retain ownership of the character, the trading component 500 can unblock the access to the character.

More specifically, the trading component 500 includes a code verification component 510 that verifies current ownership of the code and locks the character associated with it. If the character is transferred to another user, a transfer component 520 disables or deletes the locked code and generates and/or assigns a new code for the character. The same is done for coded-items (e.g., auxiliary products) associated with the character such as the character's weapons, clothing, accessories, furnishings, equipment, etc.

The trading component 500 also comprises a character analysis component 530 that can examine character data for the particular character including the list of attributes associated with the character, its class, current status, and its experiences. Experiences can include wins, losses, competition participation, and/or game or other manipulation participation. After this data has been collected and evaluated, a valuation component 540 can determine a value for the character using the character data as well as previous completed transfers of similar characters, current and projected popularity of and demand for the character in consideration of its class, type, and/or attribute list. If the current status of the character indicates that the character is injured or ill or has not completely healed or recovered, then the overall value can decrease by a variable amount depending on the extent of the injury or illness.

A processing fee can be charged to the user for each character posted via the trading component (e.g., a fixed fee per transaction or percentage of final sale price).

Alternatively or in addition, the valuation component 520 can analyze the market value of a character without requiring the character to be posted for sale, auction, or trade. A separate fee can be charged for this service. Users can also employ a fee-based advertising component 550 in order to create more interest for their characters and/or for the users who are developing such characters. As a result, other users may target certain users who consistently offer good characters for sale, auction, or trade.

In some cases, a user may wish to sell its account including all characters and their related items. For these instances, the entire account can be evaluated based on the valuation of each character if sold individually or in groups of at least two. This is because some characters may have a higher value when paired with a complimentary counterpart than when considered alone. If desired, the user can indicate how characters are to be grouped when offered for sale or how they must be sold.

The character and development system as discussed throughout FIGS. 1-5 can also catalog a user's collection of characters in order to maintain a history of characters and related items that have been acquired, trained, and/or sold by the user over time. For each character, statistics (e.g., ERA and RBI for baseball playing characters), attributes, experiences, and training can be stored and subsequently retrieved and viewed. If the character is a member of a team, team statistics can also be stored and viewed. As a result, each user can build a portfolio that can be securely viewed and shared with others.

The portfolio can also include any pertinent family history for each character. Characters can be mated or bred to have offspring. As a result, at least a portion of the parent character's attributes can be inherited by the offspring. The inheritance of attributes can be randomly or equally distributed among the offspring. In addition, the number of times or frequency with which characters can mate or breed can be limited in order to prevent diminishing the value of similar characters or of other characters in a similar class. When a character is sold to another user, their family history can be passed along with them so each subsequent owner can track the character's heritage as well.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

What is claimed is:

1. A method, comprising:
   registering, using a computer system, a character associated with a first user, said registering using registration information, wherein said registration information comprises a first unique code that is received by said computer system, and is entered into said computer system and, responsive to being entered, automatically registers a character associated with said registration information;
   based on said registration information, providing access to information indicative of the character on a website associated with said computer system, which information represents said character, said character having plural initial attributes based on said information, each of said initial attributes are changed by the first user through interaction with the character on the website to form a personalized version of the character that has different attributes than said initial attributes; and using said computer system, transferring the character including all of its changed characteristics from the first user to a second user and, continuing to grant the first user access to said website but preventing said first user from controlling said character after said transferring, and deactivating the first unique code after the character is transferred to said second user, and creating and providing a second unique code to the second user, where the second unique code is subsequently received from said second user and used to register and associate the character with the second user, and wherein the first unique code is no longer usable to be received to register the character after receiving the second unique code from the second user.

2. A method as in claim 1, wherein said interacting with said character comprises training the character to increase values of said attributes.

3. A method as in claim 2, wherein said initial attributes are levels and are represented by numerical values that can be increased by certain actions that the user takes with the character.

4. A method as in claim 1, further comprising registering certain auxiliary items that are associated with the character, wherein said transferring comprises automatically transferring both the character and said auxiliary items.

5. A method as in claim 2, wherein different ones of attribute levels have different rates of increase.

6. A method as in claim 1, further comprising requiring at least the first user to pay a fee for said transferring.

7. A method, comprising:

accepting, using a computer, interaction from a first user to access a website and to interact with at least a first character on said website;

subsequent to said accepting interaction from the first user, registering, using the computer, a second character by said first user on said website by receiving entry of a unique code that is associated with the second character and is entered into the computer, where the unique code as entered is uniquely identified with the second character, and wherein the unique code when entered causes information indicative of the second character to be obtained from a database of characteristics and associated with the second character during registration, and grants the first user access to a portion of the website for interacting with said second character, wherein said interacting customizes said second character; and subsequent to said grant of access to the portion of the website for interacting with the second character, transferring the second character from the first user to a second user, where said transfer comprises deactivating the unique code to prevent using the unique code to access the second character by entering the unique code, creating and providing a new unique code to the second user, wherein the new unique code is subsequently received from the second user and used to register and associate the character as customized by the first user with the second user, and granting the first user continued access to said first character on said website.

8. A method as in claim 7, further comprising, charging a fee for said transferring.

9. A method as in claim 7, wherein said transferring comprises listing the character for sale, and responsive to said listing, preventing the first user from interacting with the second character.

10. A method as in claim 7, further comprising maintaining the database of characteristics of characters on the website, and providing an estimated value of the second character as customized, to the first user, said database including other values being based on previous completed transfers of similar characters which are customized in similar ways to said second character.

11. A method as in claim 7, wherein said interacting comprises training the character to increase values associated with said second character, said values each associated with an attribute of said second character.

12. A method as in claim 7, wherein said information includes initial attributes associated with said second character, said initial attributes including levels that are represented by numerical values that can be increased by certain actions that the user takes to interact with the second character.

13. A method as in claim 7, further comprising registering certain auxiliary items that are associated with the second character, wherein said transferring comprises automatically transferring both the second character and said auxiliary items using the new unique code.

14. A method as in claim 11, wherein different ones of attribute levels have different rates of increase.

* * * * *